United States Patent Office 3,770,837
Patented Nov. 6, 1973

3,770,837
HYDROGENOLYSIS OF BETA-HYDROXY CARBOXYLIC ACID LACTONES
Nicolai Alexander Favstritsky and Adin L. Stautzenberger, Corpus Christi, Tex., assignors to Celanese Corporation, New York, N.Y.
No Drawing. Filed Jan. 5, 1971, Ser. No. 104,181
Int. Cl. C07c 31/20
U.S. Cl. 260—635 D    12 Claims

ABSTRACT OF THE DISCLOSURE

A beta-hydroxy carboxylic acid lactone, such as beta-hydroxy propionic acid lactone, is hydrogenolyzed to the corresponding 1,3-propanediol in the presence of a rhenium catalyst at elevated temperatures and pressures.

BACKGROUND OF THE INVENTION

Hydrogenolysis of beta-propiolactone (BPL) with conventional catalyst systems, such as copper chromite, Raney nickel, and the like, yields n-propanol and the catalyst itself is readily deactivated, i.e., rendered inactive for further use. U.S. Pat. 2,484,486 teaches that at certain conditions of temperature and pressure, in the presence of a Raney nickel catalyst, beta lactones convert to the corresponding organic carboxylic acid. U.S. 2,484,500 discloses the preparation of propionic acid from beta-propiolactone by carrying out the reduction with Raney nickel in the presence of water or copper, or both water and copper. According to this latter patent, careful control of the catalyst system prevents polymerization of the beta-propiolactone to a linear polyester of hydracrylic acid.

It can be seen from the above background that the beta-hydroxy carboxylic acid lactone reactants contemplated herein are quite unpredictable. Referring again to U.S. 2,484,486, the patentee remarks therein: According to the literature on the reduction or hydrogenolysis of gamma lactones, the cleavage would be expected to occur between the oxygen atoms to give a 1,3-glycol according to the equation:

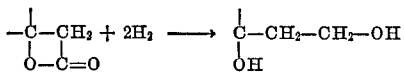

As support for this conjecture, the patentee alludes to "Reactions of Hydrogen," p. 78, by Adkins, University to Wisconsin Press, 1937. Unlike the gamma lactones the patentee's beta lactone reactants converted to their corresponding carboxylic acids in the presence of a reduction catalyst, i.e., cleavage of the lactone occurred at the alkyl-oxygen bond rather than the carbonyl-oxygen bond.

H. Smith Broadbent et al. in the Journal of Organic Chemistry, vol. 24 (1959), pp. 1847–1854, teaches the use of rhenium "blacks" as hydrogenation catalysts for a variety of compounds, including lactic acid, an alpha-hydroxy carboxylic acid, which is converted to propylene glycol (1,2-propanediol).

As is obvious from these references, it would be most difficult to predict what a beta-hydroxy carboxylic acid or its corresponding lactone would do in the presence of a rhenium (Re) reduction catalyst at elevated temperatures and pressures. Characteristic of beta-hydroxy carboxylic acids, which have a primary alcohol moiety, such as beta-hydroxy propionic acid, is the unusual reactivity of alpha hydrogen; consequently, they readily convert to the corresponding alpha-beta unsaturated acids, e.g., acrylic acid. The alpha-hydroxy carboxylic acids, on the other hand, have a secondary alcohol moiety (alpha-hydroxy) which unlike the beta-hydroxyl moiety is nowhere near as reactive; in fact, to remove it one must esterify the alpha-hydroxyl and then pyrolize or crack the resulting ester to provide an alpha-beta unsaturation. The following equation is illustrative:

$$CH_3CH(OAc)CO_2R \rightarrow HOAc + CH_2\!=\!CHCO_2R$$

In view of these and other essentially different properties existing between, say, lactic acid (an asymmetric molecule) and beta-hydroxy propionic acid, and in further view of the experiences reported in the above-discussed patents wherein a beta lactone is the reactant, it is small wonder that the invention described herein comes as a surprise.

THE INVENTION

According to the present invention a beta-hydroxy carboxylic acid lactone, wherein the hydroxy is a primary alcohol moiety, is hydrogenolyzed to the corresponding diol in the presence of a rhenium (Re) catalyst at elevated temperatures and pressures. More particularly, the instant discovery concerns the hydrogenation of a beta-hydroxy propionic acid lactone, alpha-substituted or unsubstituted, under controlled conditions in the presence of water or an inert organic solvent, or both, using a rhenium hydrogenation catalyst, such as a rhenium salt. The beta-lactone contemplated herein have the structure

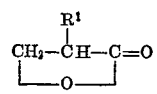

wherein $R^1$ represents lower alkyl ($C_1$–$C_4$); aryl, such as phenyl, xylyl, tolyl; aralkyl ($C_1$–$C_4$), e.g., benzyl, phenyl ethyl, ar- having the same meaning as aryl, above; cycloalkyl ($C_4$–$C_8$), such as cyclopentyl, cycloheptyl.

If desired, as will be better understood hereinafter, the beta-lactone reactant may be pre-treated with water at ambient temperatures for a pre-determined length of time to hydrolyze the beta-lactone to its corresponding beta-hydroxy propionic acid (hydracrylic acid) having the formula

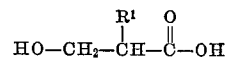

wherein $R^1$ has the same meaning given above in defining the beta-lactone structural formula; the thus hydrolyzed beta-lactone is then hydrogenated under the conditions given hereinbefore and more specifically set forth hereinafter. Generally hydrolysis is made to take place for about 24 hours or more, or until hydrolysis is essentially complete.

While the process of the present invention yields good results using a batch process, even better results are realized in a continuous process, such as one in which a fixed bed of catalyst solids or catalyst/support solids is established and the reactants and diluent passed therethrough at a rate providing suitable residence time for maximum conversions and efficiencies.

While the hydrogenolysis reaction contemplated herein may be carried out within a broad range of temperatures, say, from about 125° C. to about 260° C., best results are achieved at temperatures in the range of about 180° C. to about 220° C. By the same token, a wide range of pressures may be used, for example, from about 500 lbs. per square inch gauge to about 6,250 lbs. per square inch gauge. It is much preferred, however, to operate in a pressure range from about 3,000 lbs. per square inch gauge to about 5,000 lbs. per square inch gauge. When all else is constant, the efficiency to 1,3-propanediol decreases with the decrease in the pressure of the reaction.

It has been found, also, that by-product n-propanol (PrOH) increases with the increase in temperature of hydrogenolysis. It should be noted here that when a continuous process is used the yield of 1,3-propanediol (1,3-PDO) is a function of both the flow rate of the reactants and the temperature. This will be better understood from the examples infra.

In order to minimize the yield of a second by-product, namely, 1,3-propanediol dimer, the concenration of hydrolyzed beta-propiolactone in the aqueous feed should be controlled. By-product 1,3-propanediol dimer, while relatively insensitive to temperature and flow rate (in the continuous process), increases in yield with the concentration of hydrolyzed beta-propiolactone feed. In the batch process contemplated herein it has been found that best results are achieved using controlled concentrations (weight percent) of beta-propiolactone and/or hydrolyzed beta-propiolactone, based upon the total weight of the liquid feed composition (viz BPL, solvent, and aqueous Re catalyst solution). While significant amounts of 1,3-propandiol, substituted or unsubstituted, are realized using BPL or hydrolyzed BPL concentrations in the range of about 10% to about 35% by weight, best results are achieved using concentrations in the range of about 18% to about 26%.

In the case of the continuous process wherein a fixed bed of catalyst solids or catalyst/support solids is used, the concentrations for BPL or hydrolyzed BPL are in essentially the same range on a weight percent basis, only the concentration is computed on the basis of the weight percent of BPL or hydrolyzed BPL in the liquid feed composition (viz BPL and/or hydrolyzed BPL and water or inert organic solvent).

Of course, the hydrogen reactant is present in each of the batch and continuous processes in an amount sufficient to realize and maintain the desired pressure under which the reaction mixture is kept during the reaction period.

As indicated hereinbefore, the present invention contemplates the use of a wide variety of rhenium (Re) catalysts, such as rhenium salts. A typical, very effective catalyst is rhenium "black," i.e., hydrogenated rhenium heptoxide ($Re_2O_7$). Hydrogenation of $Re_2O_7$ may be made to take place in the reaction mixture under reaction conditions or it may be carried out separately in an aqueous or organic solvent (e.g., p-dioxane) medium, as will be seen hereinafter.

Other rhenium catalysts useful for the hydrogenolysis reactions contemplated herein are, generally, rhenium oxides, rhenium sulfides, rhenium selenides, rhenium metal, rhenium complexes, and the like. The following are merely illustrative: rhenium trioxide, rhenium oxide, rhenium (IV) oxide, rhenium (III) oxide ($ReO_3$), rhenium (II) oxide, rhenium heptasulfide ($Re_2S_7$), rhenium disulfide ($ReS_2$), rhenium heptaselenide ($Re_2Se_7$), rhenium metal, rhenium (VII) oxide-tetrahydrofuran complex, rhenium-tetrahydropyran complex, and the like. For a better understanding of these catalysts and methods for preparing same, attention is directed to "Rhenium and Its Compounds as Hydrogenation Catalysts," by H. Smith Broadbent, in the publication Annals of the New York Academy of Sciences, vol. 145, article 1, pp. 58–71, Oct. 18, 1967.

For best results the catalyst concentration (computed as Re) in the reaction mixture is in range of about 2% to about 10%, preferably between about 3.5% and about 7.5%, by weight, based upon the total weight of beta-propiolactone or hydrolyzed beta-propiolactone reactant. Obviously, in the continuous, fixed bed process discussed hereinabove the residence time in which the reactant is contacted with the catalyst or catalyst/support bed is determined by the flow rate of the liquid feed rate composition through the bed. It has been found that the preferred rate is in the range of about 300 to about 500 milliliters per hour of liquid feed composition, although rates about 35% below and above the lower and higher, respectively, preferred rates produce significant yields of 1,3-propandiol. At the preferred rates, however, efficiencies on the order of 80–95 weight percent 1,3-propanediol, with but 7–14 weight percent n-propanol and approximately 5 weight percent 1,3-propanediol dimer, are realized. In the batch process, good conversions were realized after about one (1) hour residence time, usually from about 1½ to about 4½ hours; longer residence times as high as 7 or more hours also gave significant yields.

When a catalyst support, such as carbon solids, is used with, say, rhenium black, the amount of catalyst based upon the total weight of catalyst and support is generally between about 4% and about 15% by weight, preferably between about 6.5% and about 12%, computed as Re. Other catalyst support materials contemplated herein are: silica, alumina, Carborundum, Zeolon (trade name for crystalline synthetic zeolites as sold by the Norton Company), etc.

Other inert organic solvents contemplated herein are: diethyl ether, tetrahydrofuran, petroleum ether, cyclohexane, methylal, etc.

The present invention will best be understood from the following examples which, while specific, are merely intended to be illustrative, since the person skilled in the art will readily recognize the intended modifications and variables fully within the purview of the invention.

EXAMPLES I THROUGH XXX

These examples were carried out batchwise either in a 316 stainless steel rocker-type bomb (average rocking speed about 38 cycles per minute) or in a 316 stainless steel stirred autoclave equipped with a glass liner (sold by Autoclave Engineers, Inc.). The following examples were carried out in the bomb:

I–XX AND XXV–XXX

The following examples were carried out in the autoclave:

XXI–XXIV

The reactant to be hydrogenolyzed and the catalyst were mixed and placed in the reactor and flushed twice with about 500 p.s.i.g. of hydrogen to remove extraneous air. Then the apparatus was charged with an initial hydrogen pressure of one-half to two-thirds of the desired final pressure and heated to a temperature at which appreciable reduction was observed, as indicated by the hydrogen pressure drop in the reaction vessel. The temperature of the reaction was monitored continuously by means of a thermocouple in contact with the hydrogenolysis reactor and hooked to a recorder. The pressure was maintained at a desired constant value by periodically charging the reactor with hydrogen from a compressor. Unless otherwise indicated, percentages given in Tables I through IV below are by weight, the percent efficiency, however, after being computed by the following formula:

$$\text{Percent efficiency} = \frac{\text{Percent 1, 3-PDO in product}}{\text{Percent BPL in reactant}} \times \frac{76.1}{72.1}$$

where 76.1 and 72.1 are molecular weights of 1,3-PDO and BPL respectively. Thus, percent efficiency is given as mole percent.

TABLE I.—BPL HYDROGENOLYSIS WITH RHENIUM HEPTOXIDE REDUCED IN SITU AS CATALYST

| Example number | BPL, g. | BPL, percent | Catalyst,[a] ml. | Solvent,[b] g. | Average Temp., °C. | Average Pressure, p.s.i.g. | Reaction time,[c] hrs. | Percent 1,3-PDO in reaction product | Efficiency to 1,3-PDO |
|---|---|---|---|---|---|---|---|---|---|
| I    | 11.5 | 22.3 | 0.50 | 40   | 180 | 4,300 | 4.0  | 11.4 | 51 |
| II   | 11.5 | 22.3 | 0.50 | 40   | 180 | 4,300 | 5.0  | 9.5  | 43 |
| III  | 11.5 | 22.3 | 0.50 | 40   | 200 | 4,000 | 3.3  | 12.3 | 55 |
| IV   | 11.5 | 22.3 | 0.50 | 40   | 180 | 3,900 | 6.7  | 11.7 | 52 |
| V    | 11.5 | 22.3 | 0.50 | 40   | 200 | 3,800 | 6.0  | 13.8 | 62 |
| VI   | 11.5 | 22.3 | 0.50 | 40   | 220 | 4,000 | 15.0 | 8.9  | 40 |
| VII  | 11.5 | 22.3 | 0.50 | 40   | 250 | 4,000 | 2.5  | 11.4 | 51 |
| VIII | 11.5 | 11.3 | 0.50 | 90   | 200 | 4,000 | 6.7  | 8.4  | 74 |
| IX   | 11.5 | 22.3 | 0.50 | [d]40 | 200 | 4,000 | 5.5  | 11.9 | 53 |

[a] Catalyst used: aqueous solution of rhenium heptoxide containing 1.3 g Re per ml. solution (Sold by Cleveland Refractory Metals).
[b] Solvent is water unless stated otherwise, i.e., in Example IX the solvent is dioxane.
[c] The measurements of reaction time duration were started when the desired temperature was reached and the hydrogen pressure was adjusted to the desired value; usually 30–45 minutes was required to reach the desired conditions.
[d] p-Dioxane.

TABLE II.—HYDROLYZED BPL HYDROGENOLYSIS WITH RHENIUM HEPTOXIDE REDUCED IN SITU AS CATALYST

| Example number | Percent aqueous BPL[a] | Catalyst,[b] ml. | Average temp., °C. | Average pressure p.s.i.g. | Reaction time,[c] hrs. | Yield, percent 1,3-PDO | Percent efficiency to 1,3-PDO |
|---|---|---|---|---|---|---|---|
| X      | 22.3 | 1.00 | 220 | 3,800 | 3.8  | 9.2  | 41 |
| XI     | 22.3 | 0.50 | 220 | 4,000 | 4.7  | 13.7 | 62 |
| XII    | 22.3 | 0.50 | 220 | 3,900 | 5.9  | 14.8 | 67 |
| XIII   | 22.3 | 0.50 | 200 | 4,000 | 15.0 | 10.3 | 46 |
| XIV    | 22.3 | 0.50 | 220 | 4,000 | 3.5  | 13.2 | 59 |
| XV     | 22.3 | 0.50 | 200 | 4,000 | 6.0  | 10.0 | 45 |
| XVI    | 53.5 | 0.50 | 200 | 4,000 | 6.0  | 15.9 | 30 |
| XVII   | 37.4 | 0.50 | 200 | 4,000 | 4.0  | 14.8 | 40 |
| XVIII  | 22.3 | 0.50 | 210 | 900   | 5.9  | 2.6  | 12 |
| XIX    | 22.3 | 2.00 | 200 | 3,900 | 4.0  | 14.8 | 67 |
| XX     | 22.3 | 0.50 | 200 | 2,000 | 7.0  | 11.0 | 49 |

[a] Aqueous BPL solutions were mixed at least 24 hours before hydrogenolysis (the calculated half-life at 25° ~3.5 hrs.); 50 mol of the solution was used in each run.
[b] Catalyst used: aqueous solution of rhenium heptoxide containing 1.3 g. Re per ml. solution (Cleveland Refractory Metals).
[c] The measurements of reaction time duration were started when the desired temperature was reached and the hydrogen pressure was adjusted to the desired value; usually 30–45 minutes was required to reach the desired conditions.

TABLE III.—HYDROLYZED BPL HYDROGENOLYSIS WITH RHENIUM "BLACK" DERIVED FROM RHENIUM HEPTOXIDE BY EX SITU REDUCTION[a]

| Example number | Percent aqueous BPL[b] | Average Temp., °C. | Average Pressure, p.s.i.g. | Reaction time,[c] hrs. | Percent 1,3-PDO in reaction product | Efficiency to 1,3-PDO |
|---|---|---|---|---|---|---|
| XXI   | 22.3 | 150 | 4,000 | 1.8 | 13.3 | 60 |
| XXII  | 22.3 | 150 | 4,000 | 2.0 | 12.9 | 58 |
| XXIII | 22.3 | 150 | 4,000 | 2.5 | 13.4 | 60 |
| XXIV  | 22.3 | 150 | 4,000 | 2.1 | 12.0 | 54 |

[a] Ex situ rhenium "black" was prepared by the hydrogenation of 0.50 ml. of aqueous solution of rhenium heptoxide (containing 0.65 g. Re) in 50 ml. of $H_2O$ at 150° C. and 3,900 p.s.i.g. for 3.5 hrs.
[b] Aqueous BPL solutions were mixed at least 24 hours before hydrogenolysis (the calculated half-life at 25° C.~3.5 hrs.); 50 ml. of the solution was used in each run.
[c] The measurement of reaction time duration were started when the desired temperatures was reached and the hydrogen pressure was adjusted to the desired value; usually 30–45 minutes was required to reach the desired conditions.

TABLE IV.—HYDROGENOLYSIS OF HYDROLYZED BPL WITH RHENIUM "BLACK" SUPPORTED ON CARBON[a]
(5.2% Re/C)

| Example number | Percent aqueous BPL[b] | Average Temp., °C. | Average Pressure, p.s.i.g. | Reaction time,[c] hrs. | Percent 1,3-PDO in reaction product | Efficiency to 1,3-PDO |
|---|---|---|---|---|---|---|
| XXV     | 22.3 | 175 | 4,000 | 6.3 | 14.9 | 67 |
| XXVI    | 22.3 | 200 | 4,000 | 5.3 | 16.3 | 73 |
| XXVII   | 22.3 | 200 | 4,000 | 4.5 | 18.4 | 83 |
| XXVIII  | 22.3 | 200 | 4,000 | 3.0 | 13.0 | 58 |
| XXIX    | 22.3 | 200 | 4,200 | 4.5 | 15.8 | 71 |
| XXX     | 22.3 | 200 | 4,000 | 4.5 | 13.5 | 61 |

[a] The catalyst was prepared by soaking 50 g. of activated charcoal (16 mesh) with a concentrated aqueous solution of rhenium heptoxide containing 2.6 g. Re. After each run the catalyst was washed with water and used again in the next run.
[b] Aqueous BPL solutions were mixed at least 24 hrs. before hydrogenolysis (the calculated half-life at 25° C.~3.5 hrs); 50 ml. of the solution was used in each run.
[c] The measurements of reaction time duration were started when the desired temperature was reached and the hydrogen pressure was adjusted to the desired value; usually 30–45 minutes was required to reach the desired conditions.

As is evident from the data shown in Tables I and II, above, the beta-propiolactone (BPL) to 1,3-propanediol efficiencies do not differ significantly whether BPL or hydrolyzed BPL is used as the reactant feed. It should be noted also (cf. Example IX) that very comparable efficiency is realized when BPL is hydrogenolyzed in dioxane.

EXAMPLES XXXI THROUGH XLVIII

The examples in Table V, below, were carried out by passing a continuous feed of hydrogen and hydrolyzed BPL through a fixed bed of rhenium "black" (9.8% rhenium) supported on 16 mesh carbon. The reactor was a 316 stainless steel tube, 8 feet long and having an inside diameter of 9/16 inch and a reactor volume of 400 milliliters. The BPL reactant was hydrolyzed in water for at least 24 hours prior to reaction to insure complete hydrolysis. The liquid feed (hydrolyzed BPL) and hydrogen were fed into the bottom of the vertically-disposed reactor tube and made to flow upwardly through the rhenium/carbon (catalyst/support) therein. In the examples in Table V, below, liquid product samples were taken every 3 hours on the average during continuous operation. The weight percent of each component of the product was determined by analysis and the efficiency reported in Table V, computed as described just prior to Table I, above. Table V is as follows:

TABLE V.—RHENIUM CATALYZED HYDROGENOLYSIS OF HYDROLYZED BPL

| Example number | Temp., °C. ±3 | Pressure, p.s.i.g. | Liquid feed rate, ml./hr. (+20) | Weight percent BPL in feed | 1,3-PDO Wt. percent | 1,3-PDO Mole percent | Propanol, wt. percent | 1,3-PDO dimer, wt. percent | Total acid (MW 72) wt. percent | Rate [1] |
|---|---|---|---|---|---|---|---|---|---|---|
| XXXI | 187 | 4,000 | 300 | 22.2 | 95 | 90 | 11.0 | 4.8 | <0.05 | 2.1 |
| XXXII | 187 | 4,000 | 460 | 21.7 | 91 | 86 | 7.2 | | 0.05 | 3.0 |
| XXXIII | 187 | 4,000 | 600 | 22.3 | 82 | 78 | 8.2 | | 2.2 | 3.6 |
| XXXIV | 199 | 4,000 | 310 | 22.8 | 82 | 78 | 14 | 4.3 | <0.05 | 1.9 |
| XXXV | 199 | 4,000 | 460 | 21.3 | 91 | 86 | 11 | | <0.05 | 2.9 |
| XXXVI | 199 | 4,000 | 870 | 21.3 | 83 | 78 | 10 | | 1.8 | 5.0 |
| XXXVII | 211 | 4,000 | 400 | 21.8 | 71 | 67 | 21 | | <0.05 | 2.0 |
| XXXVIII | 211 | 4,000 | 520 | 22.1 | 72 | 69 | 19 | | <0.05 | 2.8 |
| XXXIX | 211 | 4,000 | 600 | 22.8 | 76 | 72 | 18 | 4.8 | <0.05 | 3.4 |
| XL | 211 | 4,000 | 860 | 21.5 | 84 | 80 | 14 | | 0.20 | 5.1 |
| XLI | 217 | 4,000 | 400 | 21.8 | 61 | 58 | 25 | | <0.05 | 1.8 |
| XLII | 217 | 4,000 | 520 | 21.8 | 68 | 64 | 19 | | <0.05 | 2.5 |
| XLIII | 217 | 4,000 | 860 | 22.0 | 79 | 75 | 18 | | 0.09 | 4.9 |
| XLIV | 187 | 4,000 | 320 | 37.5 | 57 | 54 | 12 | 8.5 | 3.2 | 2.3 |
| XLV | 187 | 4,000 | 300 | 12.3 | 77 | 73 | 12 | 2.2 | <0.05 | 0.9 |
| XLVI | 187 | 4,000 | 600 | 12.3 | 81 | 77 | 8.5 | 2.5 | <0.05 | 2.0 |
| XLVII | 187 | 4,000 | 800 | 12.3 | 79 | 75 | 4.2 | 3.2 | 0.12 | 2.6 |
| XLVIII | 187 | 3,000 | 460 | 21.3 | 71 | 67 | 7.2 | | 1.5 | 2.3 |

[1] 1,3-PDO formation in moles/hr.-liter.

The Table V analyses (efficiency) are based upon a weight average of the several products found during a continuous run for each example under the conditions given in the table for these examples. The supported rhenium catalyst employed withstood literally hundreds of hours of service without any significant loss of activity.

It is obvious from summary Table V, above, that efficiency to 1,3-propanediol is in the range of 80% to 95% by weight.

It should be remembered that the catalyst, reactant feeds, reaction media and the reaction conditions used in the above examples are merely illustrative, and it will be obvious to the person skilled in the art that numerous modifications are contemplated within the general purview of the present invention. As indicated hereinbefore, for example, rhenium "black" may be substituted by other rhenium type catalysts; beta-propionlactone or hydrolyzed BPL of the various examples above, may be replaced by an alpha-carbon substituted BPL or hydrolyzed BPL to give the corresponding diol having the formula

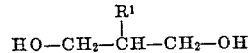

wherein R[1] is as defined hereinbefore; etc. Such modifications, in other words, and other similar ones may be made without departing from the spirit and scope of the invention as defined in the appended claims.

What is claimed is:

1. A method which comprises hydrogenating beta-hydroxy propionic acid or beta-propiolactone at elevated temperature and pressure in the presence of rhenium black, and recovering 1,3-propanediol as the reaction product.

2. The method of claim 1 wherein the reactant is beta-propiolactone.

3. The method of claim 1 wherein the reactant is beta-hydroxy propionic acid.

4. The method of claim 1 wherein the rhenium black is prepared by the in-situ reduction of rhenium heptoxide.

5. The method of claim 1 wherein the rhenium black catalyst is employed on a carbon support.

6. The method of claim 1 wherein the reaction is conducted in a solvent medium selected from the group consisting of water, diethyl ether, tetrahydrofuran, petroleum ether, cyclohexane, and methylal.

7. The method of claim 6 wherein the solvent is water.

8. The method of claim 6 wherein the medium is an inert organic solvent selected from the group consisting of diethyl ether, tetrahydrofuran, petroleum ether, cyclohexane, and methylal.

9. The method of claim 8 wherein the solvent is p-dioxane.

10. The method of claim 1 wherein the reaction is run continuously by passing, at a controlled rate, the reactant in contact with rhenium catalyst and the resulting product diol is continuously recovered.

11. The method of claim 1 wherein the reaction temperature is in the range of about 125° C. to about 260° C. and the pressure is in the range of about 500 to about 6,250 pounds per square inch gauge.

12. The method of claim 1 wherein the reaction temperature is in the range of about 180° C. to about 220° C. and the pressure is in the range of about 3,000 to 5,000 pounds per square inch gauge.

References Cited

UNITED STATES PATENTS

| 2,094,611 | 10/1937 | Lazier | 260—635 D |
| 2,305,104 | 12/1942 | Pardee | 260—635 D |
| 2,473,406 | 6/1947 | Zellner et al. | 260—635 D |
| 2,607,805 | 8/1952 | Gresham | 260—635 D |
| 3,268,588 | 8/1966 | Horlenko et al. | 260—635 D |

OTHER REFERENCES

Davenport et al.: "Ind. & Eng. Chem.," vol. 60, 1968, pp. 10–19.

Broadbent et al.: "J. Org. Chem.," 24, 1959, pp. 1847–54.

LEON ZITVER, Primary Examiner

J. E. EVANS, Assistant Examiner

U.S. Cl. X.R.

260—615 R, 617 C, 618 H, 638 A, 642